(12) United States Patent
McClellan et al.

(10) Patent No.: US 7,987,933 B1
(45) Date of Patent: Aug. 2, 2011

(54) MOTORIZED STROLLER APPARATUS

(76) Inventors: John L. McClellan, Birmingham, AL (US); Bertha L. McClellan, Birmingham, AL (US)

( * ) Notice: Subject to any disclaimer, the term of this patent is extended or adjusted under 35 U.S.C. 154(b) by 316 days.

(21) Appl. No.: 12/370,256

(22) Filed: Feb. 12, 2009

(51) Int. Cl.
*B60K 1/00* (2006.01)

(52) U.S. Cl. ........................................ 180/65.1; 280/647

(58) Field of Classification Search ............... 180/65.1; 280/47.38, 304.1, 642, 643, 644, 647, 648, 280/650, 658
See application file for complete search history.

(56) References Cited

U.S. PATENT DOCUMENTS

| | | | |
|---|---|---|---|
| 4,629,950 A | 12/1986 | Ching | |
| D321,851 S | 11/1991 | Louszko, Jr. | |
| 5,370,572 A | 12/1994 | Lee | |
| 5,873,425 A | 2/1999 | Yang | |
| 5,937,961 A | 8/1999 | Davidson | |
| 6,360,836 B1 * | 3/2002 | Milano et al. | 180/65.6 |
| 7,077,405 B2 * | 7/2006 | Akpom | 280/47.38 |
| 7,077,423 B2 * | 7/2006 | Hutchinson | 280/649 |
| 7,198,122 B1 * | 4/2007 | Smith | 180/12 |
| 7,726,683 B2 * | 6/2010 | Moriguchi et al. | 280/642 |
| 2006/0131840 A1 * | 6/2006 | Donay | 280/642 |
| 2007/0108710 A1 * | 5/2007 | Pennisi et al. | 280/47.38 |
| 2008/0048482 A1 * | 2/2008 | Chen et al. | 297/467 |
| 2008/0202833 A1 * | 8/2008 | Dickie | 180/65.6 |
| 2009/0095547 A1 * | 4/2009 | Swett et al. | 180/65.1 |
| 2010/0012404 A1 * | 1/2010 | Chiu | 180/65.1 |

* cited by examiner

*Primary Examiner* — John D Walters
(74) *Attorney, Agent, or Firm* — Crossley Patent Law; Mark A. Crossley

(57) ABSTRACT

The motorized stroller apparatus features double wheels at all four corners for lesser rolling resistance over various surfaces. The front wheel sets are fully pivotal. The on/off switch provides more than one function. In the on position, the motor is connected with the axle. The motor thereby serves as an automatic brake until the spring biased throttle lever is actuated. Spring bias causes throttle shut off when released. In the off position, the switch disengages the axle from the motor, thereby allowing for stroller function in a non-powered mode. The optional dual rear wheel sets drive encourages the stroller to track straight, as opposed to single wheel set drive which would continually encourage angular propulsion.

3 Claims, 4 Drawing Sheets

Ferred, but nonetheless illustrative, embodiments of the improved motorized stroller apparatus when taken in conjunction with the accompanying drawings.

MOTORIZED STROLLER APPARATUS

BACKGROUND OF THE INVENTION

Pushing a child's stroller can often be difficult, especially on uneven surfaces, soft surfaces, and up hills. Motorization of a stroller, therefore, has become an attractive feature. Several key elements exist in properly motorizing a stroller, though. Problems encountered in the past include complex gearing and drive systems, retrofit kits that are overly complex and expensive, and lack of needed safety features. The present apparatus solves these problems with a basic, direct drive motorized stroller apparatus.

FIELD OF THE INVENTION

The motorized stroller apparatus relates to child strollers and more especially to a motorized stroller with selective direct-drive capability and selective automatic braking.

SUMMARY OF THE INVENTION

The general purpose of the motorized stroller apparatus, described subsequently in greater detail, is to provide a motorized stroller apparatus which has many novel features that result in an improved motorized stroller apparatus which is not anticipated, rendered obvious, suggested, or even implied by prior art, either alone or in combination thereof.

To attain this, the motorized stroller apparatus provides strong lightweight frame members. The padded pivoting tray is pivoted from a position about parallel with the ground to a position against the handlebars. The canopy collapses for further convenience and for saving space when needed. The wheel sets all feature double wheels for lesser rolling resistance over various surfaces. The front wheel sets are fully pivotal. The on/off switch provides more than one function. In the on position, the motor is engaged with the axle. The motor thereby serves as an automatic brake until the throttle lever is actuated. In the off position, the switch disengages the axle from the motor, thereby allowing for stroller function in a non-powered mode. The selective direct-drive motor/axle combination also saves considerably over previously offered motorized strollers which are supplied with complex gearing and belted power transfer systems. The optional dual rear wheel set drive encourages the stroller to track straight, as opposed to one side wheel set drive which would continually encourage angular propulsion.

Thus has been broadly outlined the more important features of the improved motorized stroller apparatus so that the detailed description thereof that follows may be better understood and in order that the present contribution to the art may be better appreciated.

An object of the motorized stroller apparatus is to propel the stroller without an operator having to push.

Another object of the motorized stroller apparatus is to be basically and inexpensively designed and produced.

A further object of the motorized stroller apparatus is to ensure child safety. An added object of the motorized stroller apparatus is to provide automatic braking.

And, an object of the motorized stroller apparatus is to provide selective engagement of the motor and axle, thereby providing a free-wheeling mode of operation and a powered mode of operation.

These together with additional objects, features and advantages of the improved motorized stroller apparatus will be readily apparent to those of ordinary skill in the art upon reading the following detailed description of presently preferred, but nonetheless illustrative, embodiments of the improved motorized stroller apparatus when taken in conjunction with the accompanying drawings.

In this respect, before explaining the current embodiments of the improved motorized stroller apparatus in detail, it is to be understood that the motorized stroller apparatus is not limited in its application to the details of construction and arrangements of the components set forth in the following description or illustration. Those skilled in the art will appreciate that the concept of this disclosure may be readily utilized as a basis for the design of other structures, methods, and systems for carrying out the several purposes of the improved motorized stroller apparatus. It is therefore important that the claims be regarded as including such equivalent constructions insofar as they do not depart from the spirit and scope of the motorized stroller apparatus. It is also to be understood that the phraseology and terminology employed herein are for purposes of description and should not be regarded as limiting.

DETAILED DESCRIPTION OF THE DRAWINGS

With reference now to the drawings, and in particular FIGS. 1 through 4 thereof, the principles and concepts of the motorized stroller apparatus generally designated by the reference number 10 will be described.

Figure 1:
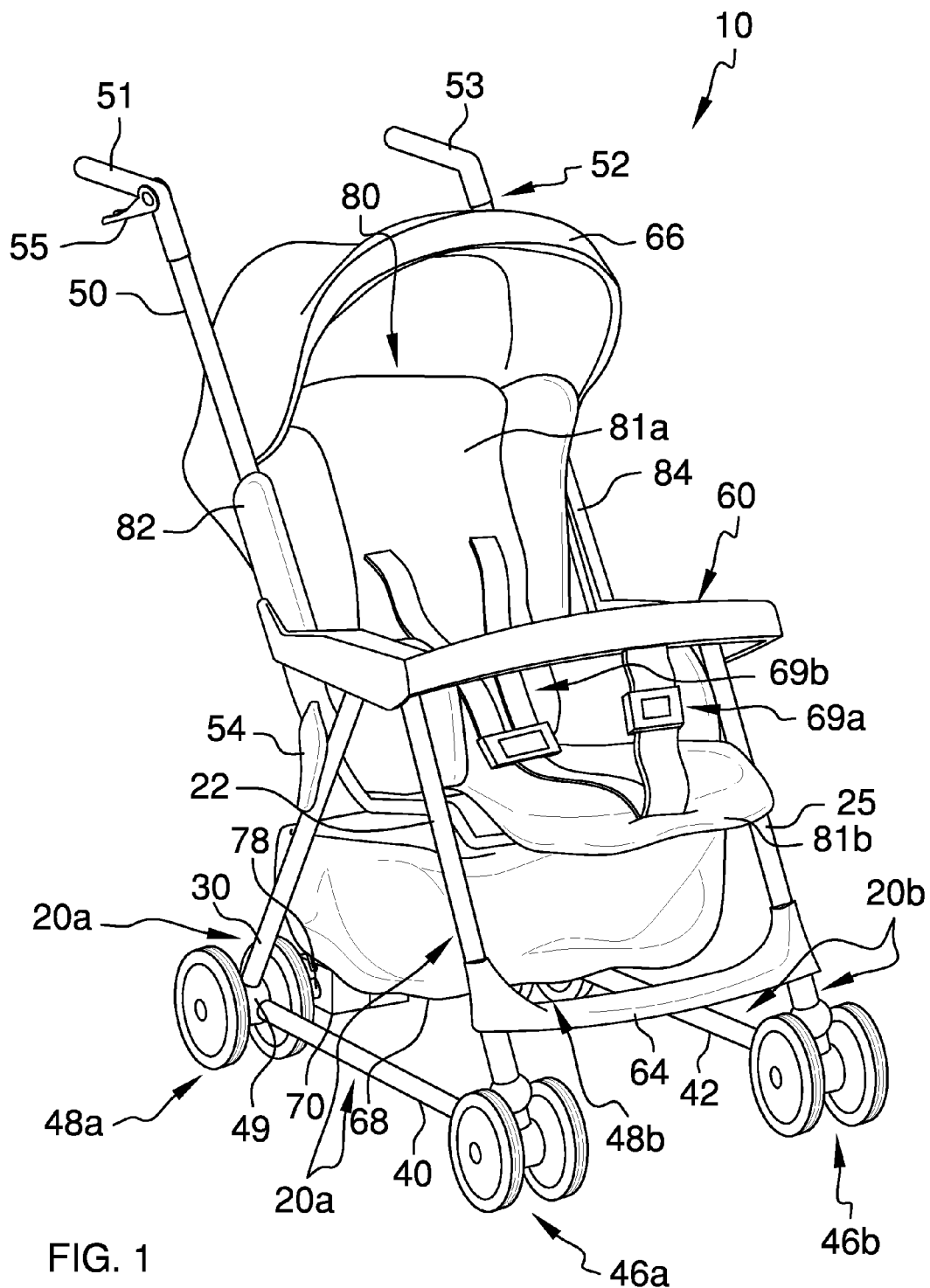
FIG. 1 is a perspective view.
Figure 2:
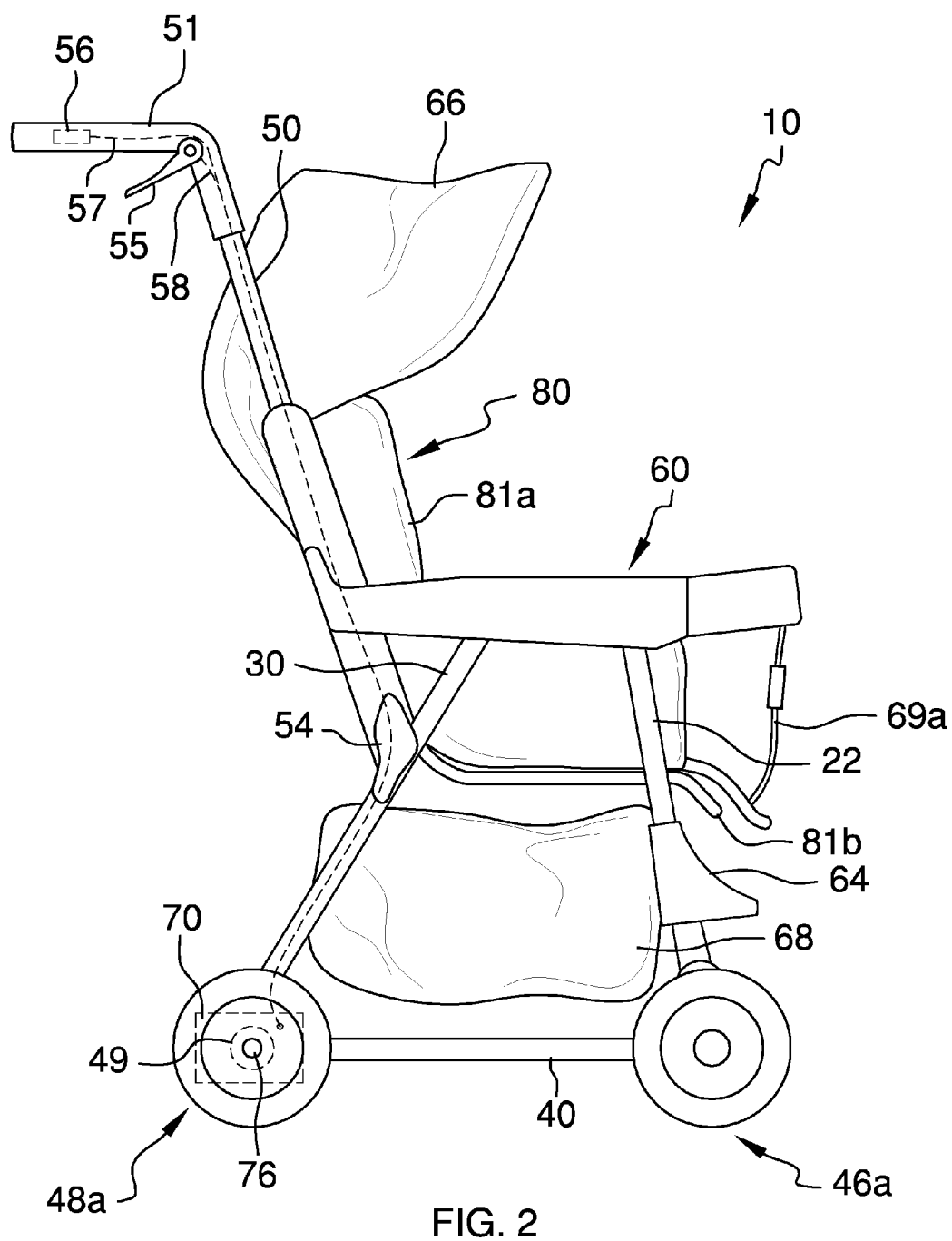
FIG. 2 is a lateral elevation view.

Referring to FIGS. 1 and 2, the motorized stroller apparatus 10 partially comprises the pair of identical hollow triangulated frames comprising the first triangulated frame 20*a* spaced apart from the second triangulated frame 20*b*. The first triangulated frame 20*a* comprises the first forward frame member 22 angularly connected to the first rear frame member 30. The first horizontal strut 40 forms the base of the first triangulated frame 20*a*. The second triangulated frame 20*b* comprises the second forward frame member 25 angularly connected to the second rear frame member (not show) which is identical to the first rear frame member 30. The second horizontal strut 42 joins the second forward frame member 25 to the second rear frame member. The second horizontal strut 42 forms the base of the second triangulated frame 20*b*. The hollow first handlebar 50 is connected to the first rear frame member 30. The first reinforcement 54 is importantly disposed at the first handlebar 50 and the first rear frame member 30 and provides strength in the connection thereof. The footrest 64 is affixed to the first forward frame member 22 and the second forward frame member 25.

Figure 3:
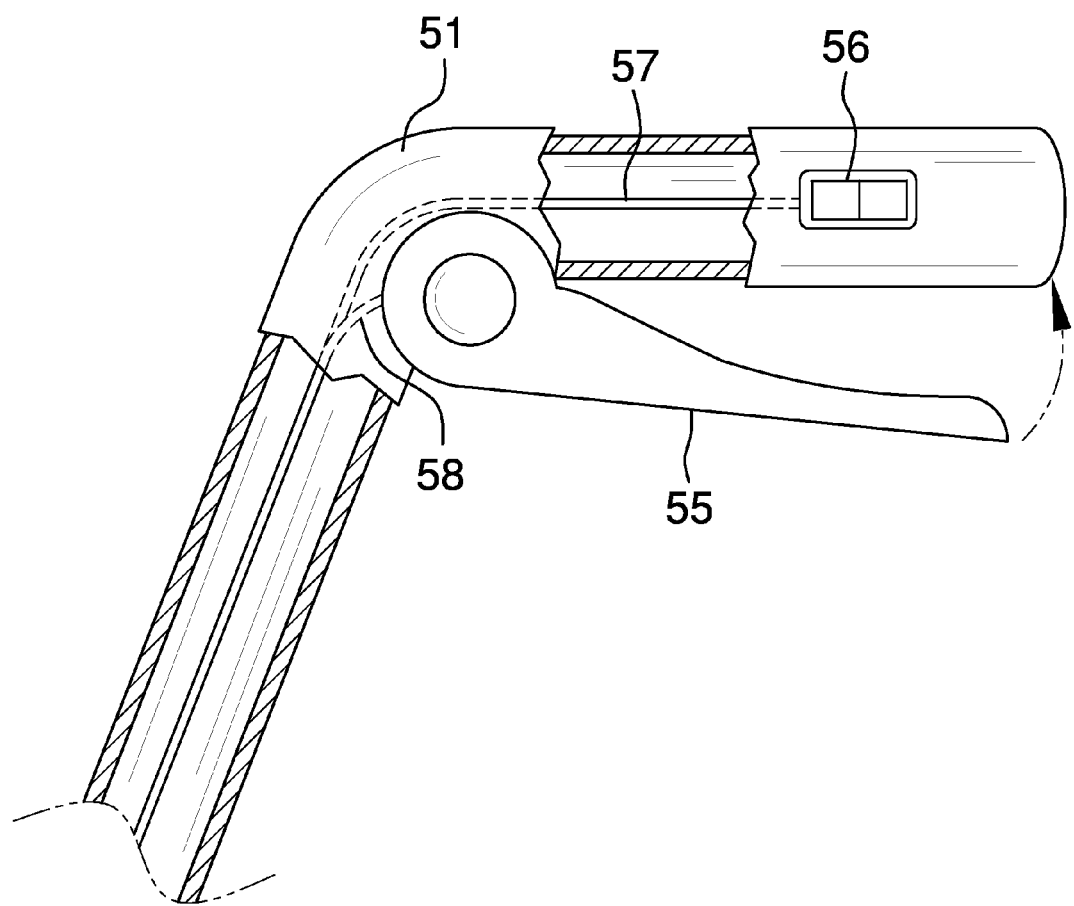
FIG. 3 is a partial cross sectional view of FIG. 2, illustrating on/off switch and throttle lever.
Figure 4:
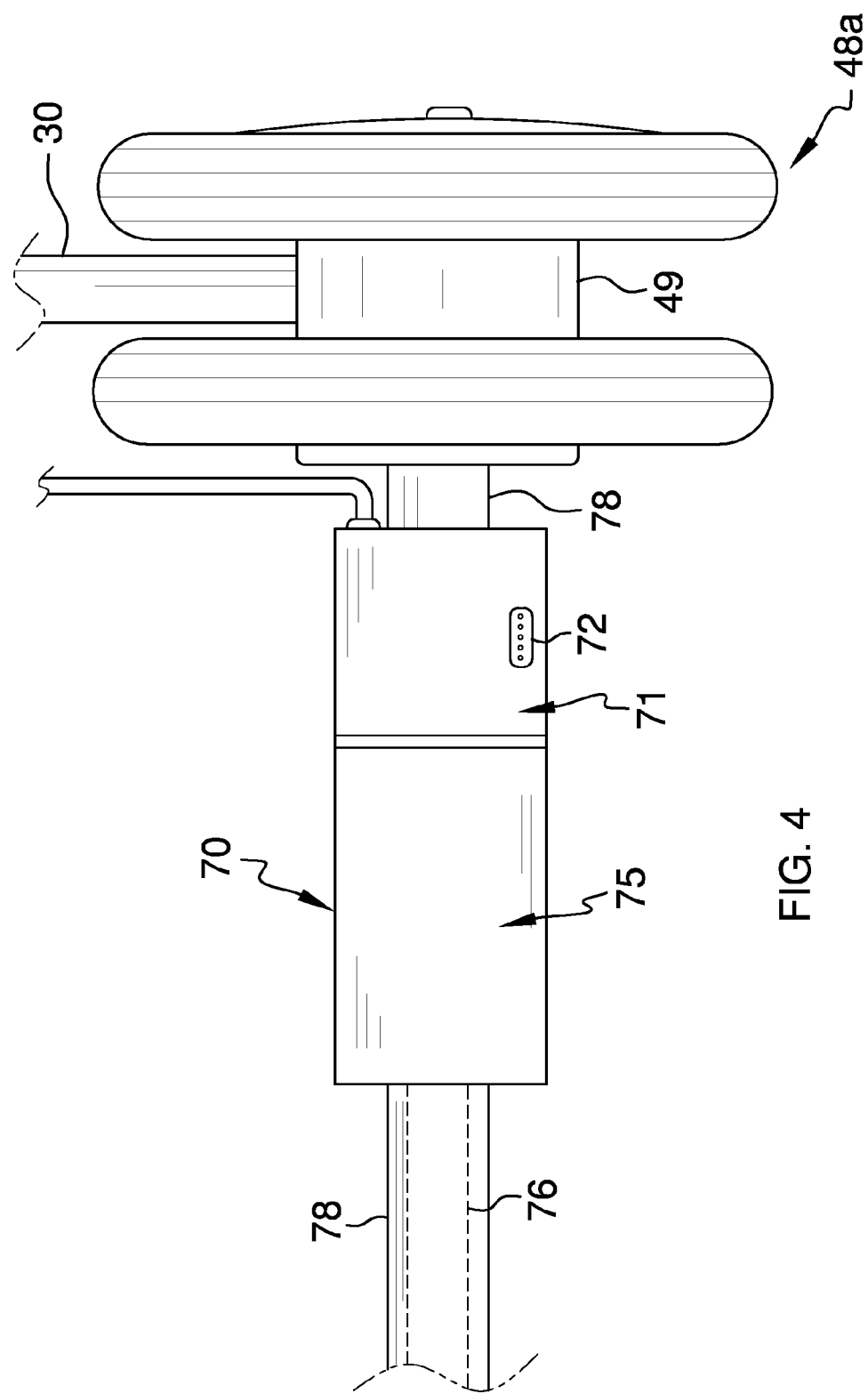
FIG. 4 is a partial rear elevation view of FIG. 2, illustrating drive housing and axle.

Continuing to refer to FIGS. 1 and 2 and referring also to FIG. 3, the hollow first padded angled handle 51 is disposed atop the first handlebar 50. The on/off switch 56 is disposed in the first padded angled handle 51. The spring-biased throttle lever 55 is pivotally disposed downwardly on the first padded angled handle 51 and returns to off position when released. The hollow second handlebar 52 is connected to the second rear frame member. The second reinforcement (not shown) is a mirror image of the first reinforcement 54 and serves a like purpose in strengthening the joining of the second handlebar 52 and the second rear frame member. The hollow second padded angled handle 53 is disposed atop the second handlebar 52. The on/off switch 56 and the throttle lever 55 are available on either of the padded angled handles. The seat 80 comprises the seat back 81a affixed to the seat bottom 81b. The pliable pouch 68 is disposed below the seat 80 and provides a convenient storage feature. The first lateral pad 82 is disposed on the first handlebar 50 adjacent to the seat 80. The second lateral pad 84 is disposed on the second handlebar 52 adjacent to the seat 80. The padded tray 60 is pivotally attached to the lateral pads. The forward belt 69a is selectively attached to the tray 60 and forwardly to the seat bottom 81b. The shoulder harness 69b is selectively attached to the seat back 81a and forwardly to the set bottom 81b. The collapsible canopy 66 is affixed to the seat back 81a. The first pivoting wheel set 46a is pivotally connected to the first forward frame member 22 and the first horizontal strut 40. The second pivoting wheel set 46b is pivotally connected to the second forward frame member 25 and the second horizontal strut 42. The first collar 49 is affixed to the first rear frame member 30 and the first horizontal strut 40. The second collar (not shown) is identical to the first collar 49 and is affixed to the second rear frame member and the second horizontal strut 42. The first rear wheel set 48a is rotateably fitted to an each side of the first collar 49. The second rear wheel set 48b is rotateably fitted to an each side of the second collar.

Referring to FIG. 4 and again to FIG. 2, the axle tube 78 connects the first collar 49 to the second collar. The axle 76 is rotateably housed within the axle tube 78. The axle 76 connects the first rear wheel set 48a to the second rear wheel set 48b. The drive housing 70 is affixed around the axle tube 78. The drive housing 70 is disposed between the first rear wheel set 48a and the second rear wheel set 48b. The rechargeable battery 71 is disposed within the drive housing 70. The charge port 72 is disposed rearwardly on the drive housing 70. The charge port 72 is connected to the battery 71 and provides the means for recharging the battery 71. The motor 75 is disposed within the drive housing 70. The motor 75 is in selective communication with the axle 76. The motor 75 is in communication with the battery 71. The motor 72 is in communication with the on/off switch 56 via the electrical connection 57. The motor 75 is in communication with the throttle lever 55 via the throttle connection 58. The on/off switch 56 is important in selectively engaging and disengaging the motor 75 from the axle 76. This feature is also a safeguard. By switching the on/off switch 56 to the off position, the rear wheel sets are free to turn independently of the motor 75. With the on/switch 56 in the on position, the motor 75 is engaged with the axle 76, thereby acting as a brake unless powered by the throttle lever 55. The throttle lever 55 is spring loaded such that the lever 55 must be depressed toward the first padded angled handle 51 in order to power the motor 75.

With respect to the above description then, it is to be realized that the optimum dimensional relationships for the parts of the motorized stroller apparatus, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the motorized stroller apparatus.

Directional terms such as "front", "back", "in", "out", "downward", "upper", "lower", and the like may have been used in the description. These terms are applicable to the embodiments shown and described in conjunction with the drawings. These terms are merely used for the purpose of description in connection with the drawings and do not necessarily apply to the position in which the motorized stroller apparatus may be used.

Therefore, the foregoing is considered as illustrative only of the principles of the motorized stroller apparatus. Further, since numerous modifications and changes will readily occur to those skilled in the art, it is not desired to limit the motorized stroller apparatus to the exact construction and operation shown and described, and accordingly, all suitable modifications and equivalents may be resorted to, falling within the scope of the motorized stroller apparatus.

What is claimed is:

1. A motorized stroller apparatus, comprising, in combination:

a pair of identical hollow triangulated frames comprising a first triangulated frame spaced apart from a second triangulated frame, the first triangulated frame comprising a first forward frame member angularly connected to a first rear frame member, a first horizontal strut forming a base of the first triangulated frame, the second triangulated frame comprising a second forward frame member angularly connected to a second rear frame member, a second horizontal strut joining the second forward frame member to the second rear frame member, the second horizontal strut forming a base of the second triangulated frame;

a footrest connected to the first forward frame member and the second forward frame member;

a hollow first handlebar connected to the first rear frame member;

a first reinforcement disposed at the first handlebar and the first rear frame member;

a hollow first padded angled handle disposed atop the first handlebar;

an on/off switch disposed in the first padded angled handle;

a throttle lever disposed downwardly on the first padded angled handle;

a hollow second handlebar connected to the second rear frame member;

a second reinforcement disposed at the second handlebar and the second rear frame member;

a hollow second padded angled handle disposed atop the second handlebar;

a seat disposed between the first triangulated frame member and the second triangulated frame member, the seat further disposed between the first handlebar and the second handlebar, the seat comprising a seat back affixed to a seat bottom;

a pliable pouch disposed below the seat;

a first lateral pad disposed on the first handlebar adjacent to the seat;

a second lateral pad disposed on the second handlebar adjacent to the seat;

a padded tray pivotally attached to the lateral pads;

a forward belt selectively attached to the tray and forwardly to the seat bottom;

a shoulder harness selectively attached to the seat back and forwardly to the seat bottom;

a first pivoting wheel set pivotally connected to the first forward frame member and the first horizontal strut;

a second pivoting wheel set pivotally connected to the second forward frame member and the second horizontal strut;

a first collar affixed to the first rear frame member and the first horizontal strut;

a second collar affixed to the second rear frame member and the second horizontal strut;

a collar fitted between a first wheel and a second wheel of each of the first pivoting wheel set and the second pivoting wheel set;

an axle tube connecting the first collar to the second collar;

an axle rotateably housed within the axle tube, the axle connected to one of the rear wheel sets;

a drive housing affixed around the axle tube, the drive housing disposed between the first rear wheel set and the second rear wheel set;

a rechargeable battery disposed within the drive housing;

a charge port disposed rearwardly on the drive housing, the charge port connected to the battery;

a motor disposed within the drive housing, the motor in communication with the axle, the motor in communication with the battery, the motor in communication with the on/off switch, and the motor in communication with the throttle lever.

2. A motorized stroller apparatus, comprising, in combination:

a pair of identical hollow triangulated frames comprising a first triangulated frame spaced apart from a second triangulated frame, the first triangulated frame comprising a first forward frame member angularly connected to a first rear frame member, a first horizontal strut forming a base of the first triangulated frame, the second triangulated frame comprising a second forward frame member angularly connected to a second rear frame member, a second horizontal strut joining the second forward frame member to the second rear frame member, the second horizontal strut forming a base of the second triangulated frame;

a footrest connected to the first forward frame member and the second forward frame member;

a hollow first handlebar connected to the first rear frame member;

a first reinforcement disposed at the first handlebar and the first rear frame member;

a hollow first padded angled handle disposed atop the first handlebar;

an on/off switch disposed in the first padded angled handle;

a spring-biased throttle lever disposed downwardly on the first padded angled handle, the throttle lever automatically returned to an off position when not actuated;

a hollow second handlebar connected to the second rear frame member;

a second reinforcement disposed at the second handlebar and the second rear frame member;

a hollow second padded angled handle disposed atop the second handlebar;

a seat disposed between the first triangulated frame member and the second triangulated frame member, the seat further disposed between the first handlebar and the second handlebar, the seat comprising a seat back affixed to a seat bottom;

a pliable pouch disposed below the seat;

a first lateral pad disposed on the first handlebar adjacent to the seat;

a second lateral pad disposed on the second handlebar adjacent to the seat;

a padded tray pivotally attached to the lateral pads;

a forward belt selectively attached to the tray and forwardly to the seat bottom;

a shoulder harness selectively attached to the seat back and forwardly to the seat bottom;

a first pivoting wheel set pivotally connected to the first forward frame member and the first horizontal strut;

a second pivoting wheel set pivotally connected to the second forward frame member and the second horizontal strut;

a first collar affixed to the first rear frame member and the first horizontal strut;

a second collar affixed to the second rear frame member and the second horizontal strut;

a first rear wheel set rotateably fitted to an each side of the first collar;

a second rear wheel set rotateably fitted to an each side of the second collar;

an axle tube connecting the first collar to the second collar;

an axle rotateably housed within the axle tube, the axle connecting the first rear wheel set to the second rear wheel set;

a drive housing affixed around the axle tube, the drive housing disposed between the first rear wheel set and the second rear wheel set;

a rechargeable battery disposed within the drive housing;

a charge port disposed rearwardly on the drive housing, the charge port connected to the battery;

a motor disposed within the drive housing, the motor in communication with the axle, the motor in communication with the battery, the motor in communication with the on/off switch, and the motor in communication with the throttle lever.

3. A motorized stroller apparatus, comprising, in combination:

a pair of identical hollow triangulated frames comprising a first triangulated frame spaced apart from a second triangulated frame, the first triangulated frame comprising a first forward frame member angularly connected to a first rear frame member, a first horizontal strut forming a base of the first triangulated frame, the second triangulated frame comprising a second forward frame member angularly connected to a second rear frame member, a second horizontal strut joining the second forward frame member to the second rear frame member, the second horizontal strut forming a base of the second triangulated frame;

a footrest connected to the first forward frame member and the second forward frame member;

a hollow first handlebar connected to the first rear frame member;

a first reinforcement disposed at the first handlebar and the first rear frame member;

a hollow first padded angled handle disposed atop the first handlebar;

an on/off switch disposed in the first padded angled handle;

a spring-biased throttle lever disposed downwardly on the first padded angled handle, the throttle lever automatically returned to an off position when not actuated;

a hollow second handlebar connected to the second rear frame member;

a second reinforcement disposed at the second handlebar and the second rear frame member;

a hollow second padded angled handle disposed atop the second handlebar;

a seat disposed between the first triangulated frame member and the second triangulated frame member, the seat further disposed between the first handlebar and the second handlebar, the seat comprising a seat back affixed to a seat bottom;

a pliable pouch disposed below the seat;

a first lateral pad disposed on the first handlebar adjacent to the seat;

a second lateral pad disposed on the second handlebar adjacent to the seat;
a padded tray pivotally attached to the lateral pads;
a forward belt selectively attached to the tray and forwardly to the seat bottom;
a shoulder harness selectively attached to the seat back and forwardly to the seat bottom;
a first pivoting wheel set pivotally connected to the first forward frame member and the first horizontal strut;
a second pivoting wheel set pivotally connected to the second forward frame member and the second horizontal strut;
a first collar affixed to the first rear frame member and the first horizontal strut;
a second collar affixed to the second rear frame member and the second horizontal strut;
a first rear wheel set rotateably fitted to an each side of the first collar;
a second rear wheel set rotateably fitted to an each side of the second collar;
an axle tube connecting the first collar to the second collar;
an axle rotateably housed within the axle tube, the axle connecting the first rear wheel set to the second rear wheel set;
a drive housing affixed around the axle tube, the drive housing disposed between the first rear wheel set and the second rear wheel set;
a rechargeable battery disposed within the drive housing;
a charge port disposed rearwardly on the drive housing, the charge port connected to the battery;
a motor disposed within the drive housing, the motor in communication with the axle, the motor in communication with the battery, the motor in communication with the on/off switch, the on/off switch selectively engaging and disengaging the motor from the axle, and the motor in communication with the throttle lever.

\* \* \* \* \*